(12) United States Patent
Bekker et al.

(10) Patent No.: US 7,549,343 B2
(45) Date of Patent: Jun. 23, 2009

(54) SENSOR SYSTEM FOR MEASURING PRESSURE

(75) Inventors: Viacheslav Bekker, Karlsruhe (DE); Christian Doering, Stuttgart (DE); Gottfried Flik, Leonberg (DE); Sven Zinober, Gundelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/075,650

(22) Filed: Mar. 12, 2008

(65) Prior Publication Data

US 2008/0229815 A1 Sep. 25, 2008

(30) Foreign Application Priority Data

Mar. 13, 2007 (DE) .................. 10 2007 012 060

(51) Int. Cl.
*G01L 7/06* (2006.01)

(52) U.S. Cl. .................. 73/729.1; 73/719; 73/754

(58) Field of Classification Search ........... 73/700–756; 361/283.1–283.4; 123/636–639
See application file for complete search history.

(56) References Cited

U.S. PATENT DOCUMENTS

| | | | | |
|---|---|---|---|---|
| 4,556,781 A | * | 12/1985 | Bauer | 219/270 |
| 4,728,920 A | * | 3/1988 | McKee et al. | 338/39 |
| 5,275,146 A | * | 1/1994 | Yamashita | 123/549 |
| 5,601,742 A | * | 2/1997 | Yamashita | 219/207 |
| 5,715,827 A | * | 2/1998 | Corl et al. | 600/486 |
| 5,828,290 A | * | 10/1998 | Buss et al. | 338/162 |
| 6,606,235 B2 | * | 8/2003 | Chua et al. | 361/278 |
| 6,857,420 B2 | * | 2/2005 | Weimert | 123/635 |
| 7,159,448 B2 | * | 1/2007 | Moelkner et al. | 73/35.12 |
| 7,350,494 B2 | * | 4/2008 | Schricker et al. | 123/145 A |

* cited by examiner

*Primary Examiner*—Lisa M Caputo
*Assistant Examiner*—Jermaine Jenkins
(74) *Attorney, Agent, or Firm*—Kenyon & Kenyon LLP

(57) ABSTRACT

A sensor system for measuring the pressure in the combustion chamber of an internal combustion engine, by the use of which a high measuring accuracy may be achieved, based on high measuring sensitivity and great thermal stability. In addition, the construction of the sensor system makes possible great system flexibility, and particularly very space-saving installation in the combustion chamber of an internal combustion engine. For this purpose, the sensor system includes at least one electrically conductive spring element and at least one electrically conductive counter-element, the spring element and the counter-element being in mechanical contact over at least one contact area, the contact surface of the spring element having a different curvature profile from that of the contact surface of the counter-element, so that a force action or pressure action, that have the effect of an elastic deformation of the spring element, results in a size change of the contact area between the spring element and the counter-element, and the contact surface of at least one of the two elements, the spring element and/or the counter-element, being provided with a highly resistive coating, so that a size change in the contact area results in a change in the resistance of the system composed of the spring element and the counter-element.

10 Claims, 3 Drawing Sheets

SENSOR SYSTEM FOR MEASURING PRESSURE

FIELD OF THE INVENTION

The present invention relates to a sensor system for measuring pressure in the combustion chamber of an internal combustion engine.

BACKGROUND INFORMATION

It is known that one may regulate or control the combustion process of an internal combustion engine. The fuel usage of a Diesel engine, for example, may be optimized, and the noise level may be lowered by the regulation of the fuel injection. The emission of soot and $NO_x$ may also be reduced by such a regulation. The engine regulation is preferably based on the pressure conditions prevailing in the combustion chamber, which are recorded with the aid of a combustion chamber pressure sensor. Such a sensor must not have too large a dimension, and has to have good thermal stability while having sufficient sensitivity.

Combustion chamber pressure sensors are known that are equipped with a transformer element in the form of a piezoelectric monocrystal, such as quartz or langasite, or a piezoceramic, such as PZT or BIT. Monocrystals require costly mechanical processing, and, as a rule, they have a relatively low measuring sensitivity. The piezoceramics used alternatively do have a high sensitivity, but hysteresis effects and aging effects tend to occur in their case.

Besides these, piezoresistive combustion chamber pressure sensors are known, which include metal strain gauges or Si transformer elements. Metal-based strain gauges have good thermal stability, but, because of their low sensitivity and relatively large dimensions, they are not optimally suited for use in a combustion chamber pressure sensor of an internal combustion engine. Pressure sensors based on silicon have relatively great sensitivity, but are only usable up to temperatures of ca. 140° C.

SUMMARY OF THE INVENTION

The present invention provides a sensor system for measuring pressure in the combustion chamber of an internal combustion engine, by the use of which high measuring accuracy may be achieved, based on high measuring sensitivity and great thermal stability. In addition, the construction of the sensor system according to the present invention makes possible great system flexibility, and particularly very space-saving installation in the combustion chamber of an internal combustion engine.

In addition to that, the sensor system according to the present invention includes at least one electrically conductive spring element and at least one electrically conductive counter-element, the spring element and the counter-element being in mechanical contact over at least one contact area. The contact surface of the spring element has a different curvature profile from that of the contact surface of the counter-element, so that a force action or pressure action, that has the effect of an elastic deformation of the spring element, results in a size change of the contact area between the spring element and the counter-element. In addition, the contact surface of at least one of the two elements, the spring element and/or the counter-element, is provided with a highly resistive coating, so that a size change in the contact area results in a change in the resistance of the system composed of the spring element and the counter-element.

The sensor system according to the present invention is a piezoresistive microcontact sensor. The conversion of force actions and pressure actions to an electrical signal, in this case, is based on the idea that the electrical resistance of two elements that are in mechanical contact via a highly resistive layer, in this case the spring element and the counter-element, is a function of the size of the contact area. Because of the different surface profiles of the contact areas of the spring element and the counter-element, the size of the contact area changes in a manner corresponding to the acting force. Besides the surface profiles, the construction as well as the mechanical and electrical properties of the spring element and the counter-element determine the load-resistance characteristics curve of the sensor system, so that the load-resistance characteristics curve is able to be adjusted to the requirements of the respective application by simple constructive measures.

Basically, there are various possibilities for implementing a sensor system according to the present invention, both as far as the individual components of the sensor system are concerned and with respect to the number of the components and their positioning.

As was mentioned before, the contact surface of at least one of the two conductive elements, the spring element and/or the counter-element, is provided with a highly resistive coating. The spring element and/or the counter-element are thus produced as compound elements of at least three materials having different specific resistances, so that the overall resistance of the system made up of the spring element and the counter-element is determined essentially by the highly resistive coating. That is why the area of the contact area is determinative for the overall resistance, in this case, which is then inversely proportional to the acting force. Semiconductor materials, such as $SiO_2$ or $Si_3N_4$ are suitable as coating materials, for instance. The sensitivity of the sensor system according to the present invention may even be improved by the use of piezoresistive coating materials, such as SiC or DLC.

With respect to a simple construction of the sensor system according to the present invention, it is advantageous if the counter-element is stationary and if it does not experience any substantial deformation in response to a force or pressure action.

The curvature profiles of the contact surfaces of the spring element and the counter-element should differ, according to the present invention, so that the mechanical contact comes about only via one or more contact areas. For this purpose, for example, a contact surface may be deformed homogeneously. Curved areas in a contact surface may, however, also be produced by the stamping of a specific surface profile. From a technological point of view, for instance, for the application of the highly resistive coating, it may be of advantage if the contact surface that is to be coated is flat. If the spring action of the spring element is achieved by a curved structure, the counter-element may advantageously be developed to be flat.

Since the resistance of highly resistive coating materials is often strongly temperature-dependent, measures have to be taken for temperature compensation, for certain applications of the sensor system according to the present invention. In one particularly advantageous further development of the present invention, the temperature influence is corrected by a combination of constructive measures and measures of circuit technology. For this, the sensor system is constructed in mirror symmetry, so that it either includes one counter-element that is situated between two spring elements, or at least one spring element situated between two counter-elements. In each case there is at least one contact area between two adjoining elements, so that such a system has at least two contact areas between one spring element and one counter-element. The resistances of these two contact areas change in the opposite direction when there is a force action. They are interconnected in a measuring bridge in such a way that the temperature influence on the measured variables is canceled.

There are applications in which a stand-alone implementation of the sensor system according to the present invention is meaningful, for instance, in the combustion chamber of an Otto engine. The sensor system according to the present invention, however, is not only able to be mounted simply, but also to be integrated in special application environments by appropriate constructive measures.

For the combustion chamber pressure recording in Diesel engines, for example, it has been shown to be advantageous if the at least one spring element and the at least one counter-element of the sensor system according to the present invention are developed to be annular, and the spring element has a torus-shaped, domed contact surface. For, in this case, the sensor system may simply be integrated into a cylinder head component, especially into a sheathed-type glow plug or into a fuel injector. Lead wires for the cylinder head components may be guided via the open middle of the ring, such as for the glow current, in the case of integration of the sensor system into a glow plug, or for fuel in the case of integration of the sensor system into a fuel injector.

DETAILED DESCRIPTION

Figure 1:
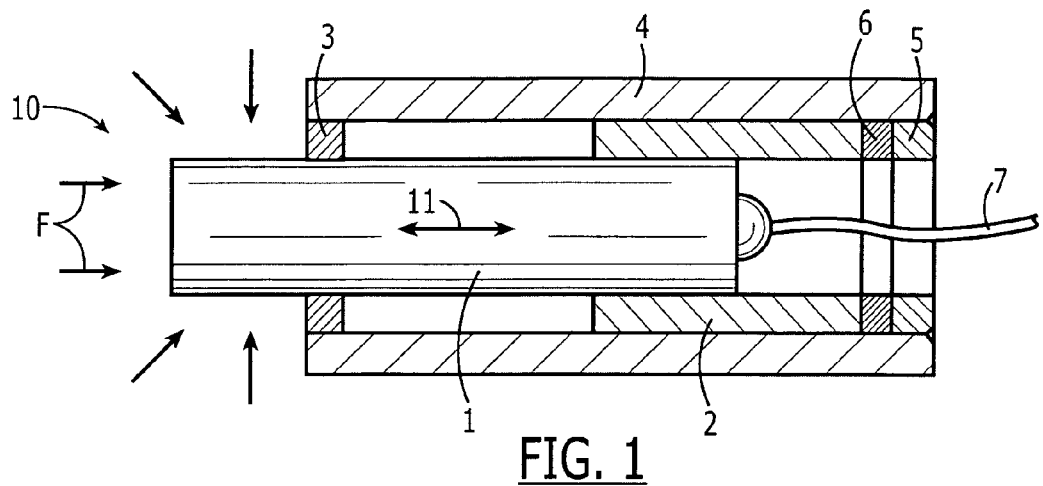
FIG. 1 shows a schematic sectional view of a measuring device for recording combustion chamber pressure, using a sensor system according to the present invention.

In measuring device 10 shown in FIG. 1, a cylinder head component, namely a heating pin 1, is used as the pressure force converting element. The one end of heating pin 1 extends into the combustion chamber. A supporting pipe 2 is fastened at the circumference of the end of the heating pin 1 facing away from the combustion chamber, which extends beyond this end of heating pin 1. At the combustion chamber end, heating pin 1 is connected via a linearly elastic sealing diaphragm 3 to a sleeve 4, which forms a guidance for supporting pipe 2, so that heating pin 1 is supported to be displaceable in axial direction 11. Sleeve 4 is provided with an annular counter-support 5 for supporting pipe 2, on the side facing away from the combustion chamber. Counter-support 5 is also used as a carrier for a sensor system 6 according to the present invention, that is also developed to be annular. In measuring device 10 shown here, the pressure conditions prevailing in the combustion chamber are transmitted as force action F via displaceably supported heating pin 1, with supporting pipe 2, directly to sensor system 6. Sensor system 6 is usually prestressed between the counter-support and the support pipe, so that tightening torques created during mounting and thermally induced mechanical stresses in the cylinder head have almost no effect on sensor system 6. Glow current lead wires 7 for heating pin 1 are guided through support pipe 2, the annular opening of sensor system 6 and of counter-support 5.

Figure 2A:
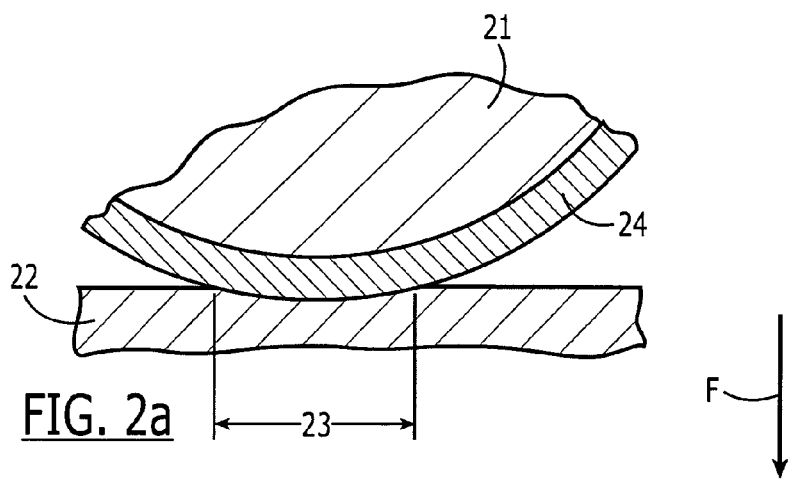
FIGS. 2a and 2b illustrate the functional principle of a piezoresistive microcontact sensor system.
Figure 2B:
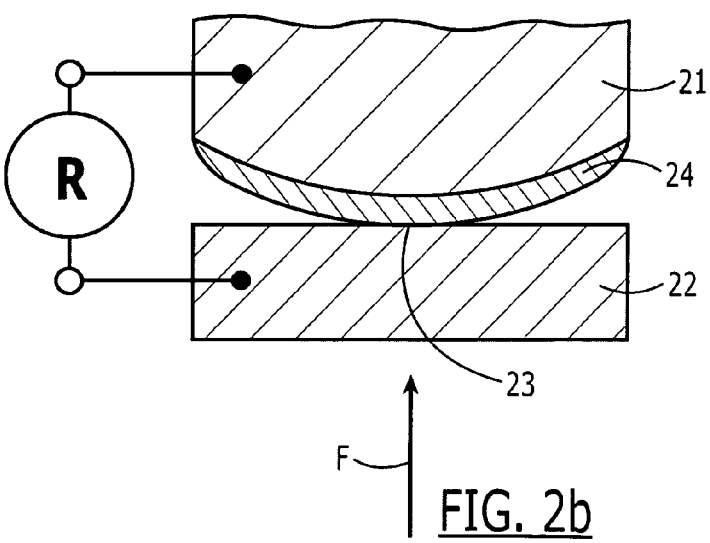

The functioning principle of a microcontact sensor element, on which sensor system 6 shown in FIG. 1 is also based, will be explained below, with reference to FIGS. 2a and 2b. A microcontact sensor device is made up of at least two parts, in this case, parts 21 and 22, which are in mechanical contact over at least one contact area 23. The two parts 21 and 22 together form an electrical resistor which is essentially determined by the magnitude of contact area 23. The contact surface of part 21 is curved and is provided with a highly resistive layer 24, which has a higher specific resistance than the electrically conductive substrate material of part 21. Thus, as the substrate material, a metal may be used, for example, that is coated with a semiconductor material, such as $SiO_2$ or $Si_3N_4$. In contrast to that, the contact surface of metallic part 22 is essentially developed to be flat and not coated. That is why the total resistance of the two parts 21 and 22 is essentially determined by the highly resistive layer 24 and the size of contact area 23. The force F, that is to be recorded, acts upon both parts 21 and 22, whereby they are pressed against each other, and at least one of the two parts 21 and/or 22 becomes elastically deformed. In the process, the size of contact area 23 changes, and consequently, so does the electrical resistance of the entire system. Consequently, there is a specified dependence between the resistance of the sensor system and force F that acts upon it. The sensitivity of the sensor system may additionally be reinforced if a piezoresistive coating material, such as SiC or DLC, is used for highly resistive layer 24.

Figure 3A:
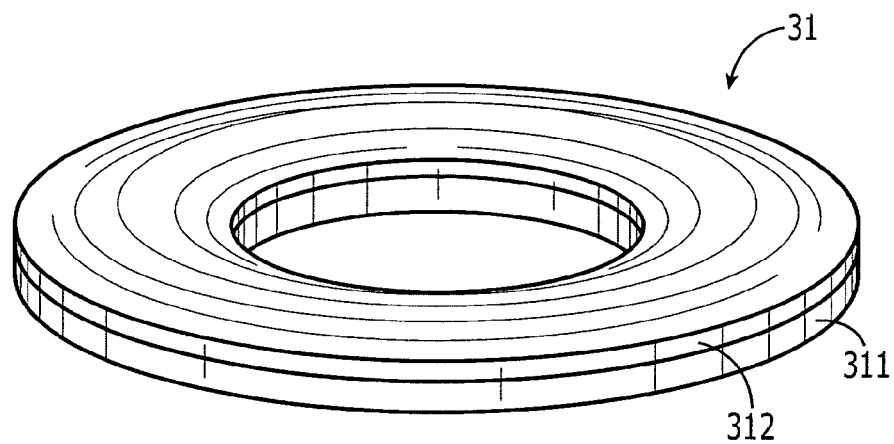
FIGS. 3a and 3b show the construction of a sensor system according to the present invention.
Figure 3B:
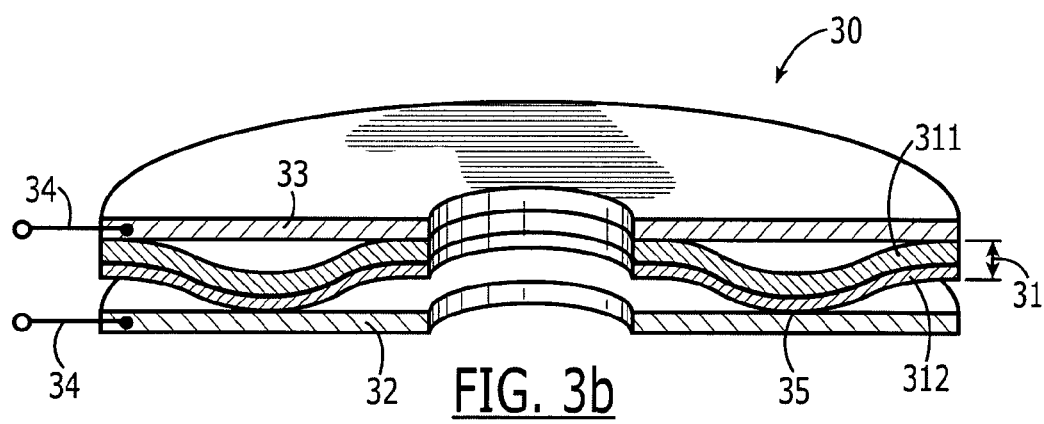

In connection with FIGS. 3a and 3b, a sensor system 30 is described which is conceived for a measuring device according to FIG. 1. This sensor device 30 includes a spring element 31, which is shown in FIG. 3a in isolation. Spring element 31 is implemented in the form of a coated annular metal plate spring 311, which is arched in the form of a torus. The upwardly arched surface of the metal plate spring 311 is provided with a highly resistive semiconductor layer 312. FIG. 3b shows spring element 31 in a system between two metallic perforated disk-shaped counter-elements 32 and 33 having terminals 34 for a measuring voltage for recording the electrical resistance of this sensor system 30. Contact area 35 that is determinative for the electrical resistance is developed, in this instance, to be annular, corresponding to the arching of spring element 31 between the coated surface of spring element 31 and lower counter-element 32.

Figure 4:
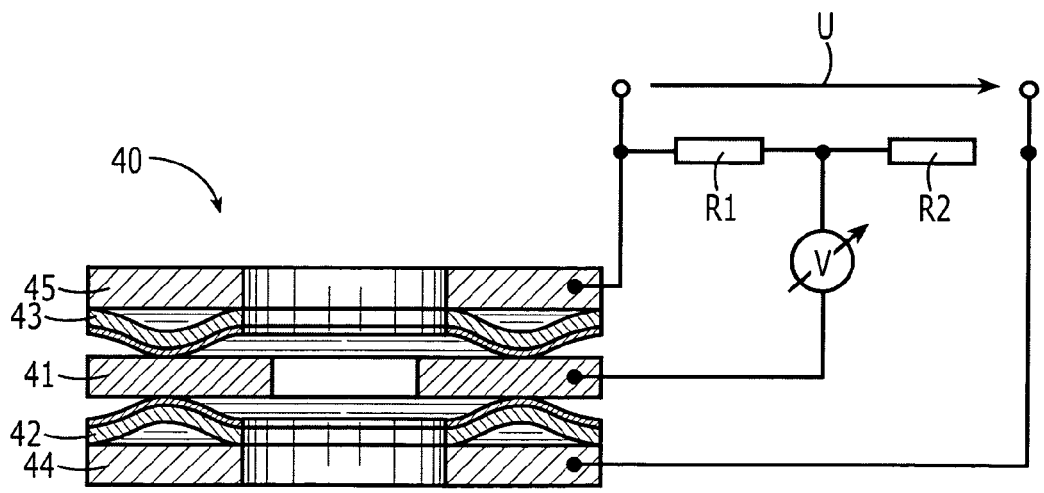
FIGS. 4-6 show schematic sectional views of three variants of a temperature-compensated sensor system corresponding to the present invention.
Figure 5:
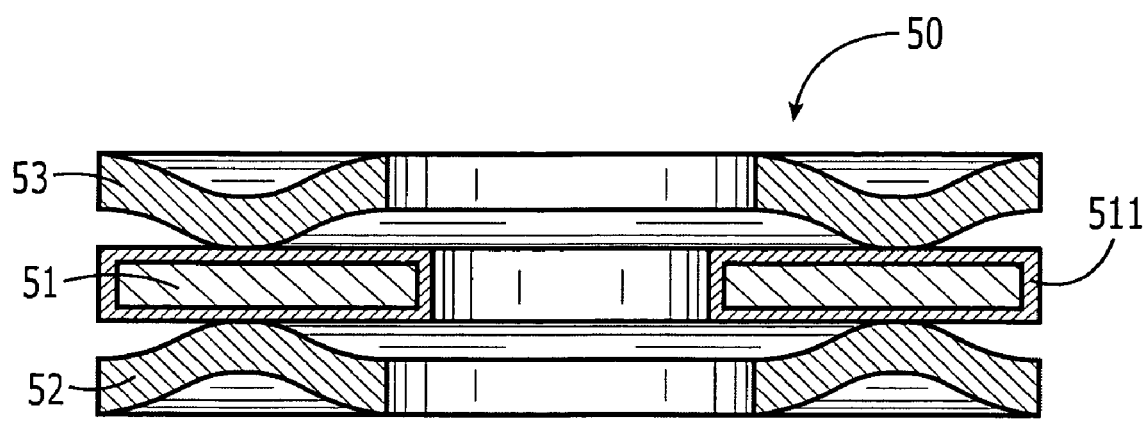
Figure 6:
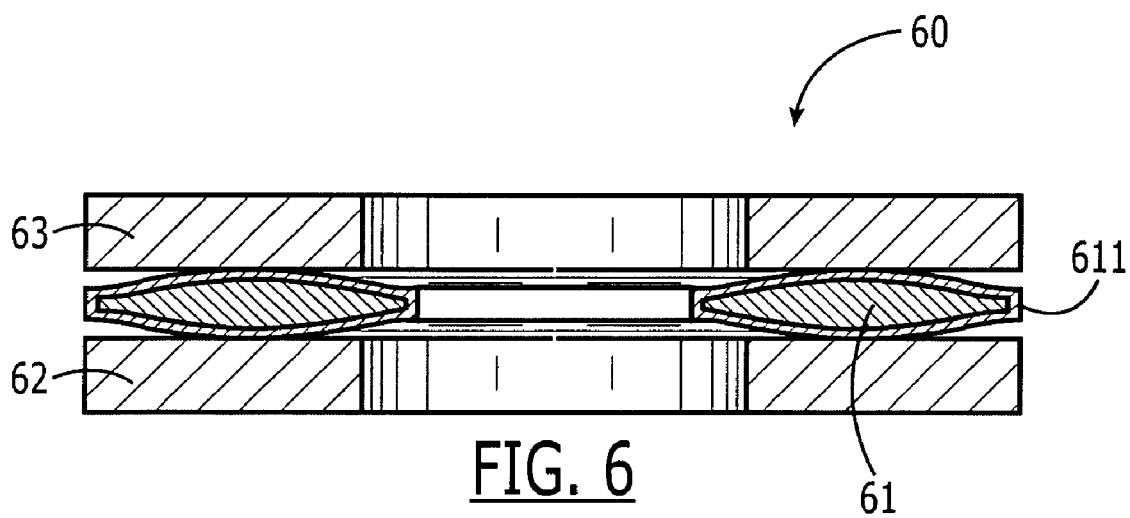

The refinements shown in FIGS. 4 to 6 show refinements of this simplest variant of a sensor system according to the present invention, in which a possible temperature dependence of the resistance of the highly resistive coating of the spring element is compensated for by a skillful construction of the sensor system and a skillful interconnection. In all three variants shown in FIGS. 4 through 6, the sensor system is constructed in mirror symmetry, so that in the sensor system at least two contact areas are developed between a spring element and a counter-element.

Thus, sensor system 40, shown in FIG. 4, includes a perforated disk-shaped counter-element 41, which is situated between two spring elements 42 and 43, which are implemented in the form of coated annular metal plate springs, the same as spring element 31 shown in FIG. 3a. The torus-shaped surfaces, arched upwards, of the two spring elements 42 and 43, each form the contact surfaces for counter-element 41, so that both between lower spring element 42 and counter-element 41 and between upper spring element 43 and counter-element 41 there exists an annular contact area 41-42 and 41-43. Besides middle counter-element 41, sensor system 40 includes another lower perforated disk-shaped counter-element 44 and an upper perforated disk-shaped counter-element 45. All the counter-elements 41, 44 and 45 are made up of an electrically conductive material, such as a metal, so that the voltage drop over contact areas 41-42 and 41-43 is able to be tapped off individually between counter-elements 41 and 44 and between counter-elements 41 and 45.

The resistors corresponding to the two contact areas 41-42 and 41-43 are interconnected to a half bridge of a Wheatstone's bridge. Two specified resistors R1 and R2 form the other half bridge, so that the relative resistance changes of contact areas 41-42 and 41-43, that are temperature-independent, are recorded using the bridge circuit.

The two spring elements 42 and 43 of sensor system 40 are prestressed. The force to be measured is introduced into middle counter-element 41 and has the effect of an additional loading or unloading of spring elements 42 and 43. Accordingly, the size of the respective contact areas 41-42 and 41-43 changes. As was mentioned before, the relative resistance change resulting from this is temperature-independent, and is able to be simply recorded with the aid of the bridge circuit.

Sensor system 50 shown in FIG. 5 differs from sensor system 40 shown in FIG. 4, essentially in that, in this case, the two flat contact surfaces of the perforated disk-shaped counter-elements 51, that are situated in the middle between spring elements 52 and 53, are provided with a highly resistive coating 511, and the contact areas of spring elements 52 and 53 are not. However, this does not have an effect on the method of functioning of sensor system 50, which is equivalent to sensor system 40. In addition, we have done without showing further counter-elements in FIG. 5, which is also unimportant as far as the method of functioning is concerned.

By contrast to the variants shown in FIGS. 4 and 5, FIG. 6 shows a sensor system 60 having a spring element 61, which is situated between two counter-elements 62 and 63. Whereas counter-elements 62 and 63 are again implemented in the form of metallic perforated disks, in this case, both contact surfaces of annular spring element 61 are arched in a torus shape and provided with a highly resistive coating 611. The tapping off of the signal is accomplished here, as explained in connection with FIG. 4, with the aid of a measuring bridge.

Finally, it should be pointed out once more that the sensor system, according to the present invention, for recording pressure in the combustion chamber of a motor vehicle, is both able to be integrated into a cylinder head component, as described, for example, in connection with FIG. 1, and may be installed as a stand-alone component.

What is claimed is:

1. A sensor system for measuring the pressure in a combustion chamber of an internal combustion engine, comprising:
   at least one electrically conductive spring element; and
   at least one electrically conductive counter-element,
   wherein the spring element and the counter-element are in mechanical contact over at least one contact area,
   wherein a contact surface of the spring element has a different curvature profile from that of a contact surface of the counter-element, so that a force action or pressure action, that has the effect of an elastic deformation of the spring element, results in a size change of the contact area between the spring element and the counter-element, and
   wherein a contact surface of at least one of the spring element and the counter-element has a highly resistive coating, so that a size change in the contact area results in a change in a resistance of the system composed of the spring element and the counter-element.

2. The sensor system according to claim 1, wherein the highly resistive coating is made up of a material whose specific resistance is higher by at least one order of magnitude than a specific resistance of material of the spring element and material of the counter-element, including a semiconductor material, including $SiO_2$ or $Si_3N_4$.

3. The sensor system according to claim 1, wherein the highly resistive coating is made up of a piezoresistive layer material, including SiC or diamond-like carbon.

4. The sensor system according to claim 1, wherein the counter-element is stationary and experiences no significant deformation in response to a force action or a pressure action.

5. The sensor system according to claim 1, wherein the contact surface of the counter-element is substantially flat.

6. The sensor system according to claim 1, wherein the at least one spring element and the at least one counter-element are situated in mirror symmetry, so that this positioning includes at least two contact areas between a spring element and a counter-element, and that two resistors implemented by the contact areas are interconnected in a measuring bridge.

7. The sensor system according to claim 6, wherein the at least one counter-element is situated between two spring elements.

8. The sensor system according to claim 6, wherein the at least one spring element is situated between two counter-elements.

9. The sensor system according to claim 1, wherein the at least one spring element and the at least one counter-element are annular, and the spring element has a torus-shaped, arched contact surface.

10. The sensor system according to claim 1, wherein the at least one spring element and the at least one counter-element are integrated into a cylinder head component, including a sheathed-type glow plug, an injector or a spark plug.

* * * * *